United States Patent
Maier et al.

(10) Patent No.: US 9,166,238 B2
(45) Date of Patent: Oct. 20, 2015

(54) ADVANCED CONTROLS ALGORITHM FOR AN ELECTRONIC PRESSURE REGULATOR SYSTEM WITH PULSED DISTURBANCES

(75) Inventors: Oliver Maier, Worms (DE); Michael Leykauf, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 774 days.

(21) Appl. No.: 13/217,888

(22) Filed: Aug. 25, 2011

(65) Prior Publication Data

US 2013/0052556 A1    Feb. 28, 2013

(51) Int. Cl.
H01M 8/04    (2006.01)

(52) U.S. Cl.
CPC .......... H01M 8/04388 (2013.01); H01M 8/04 (2013.01); H01M 8/04753 (2013.01); *H01M 2250/20* (2013.01); *Y02E 60/50* (2013.01); *Y02T 90/32* (2013.01)

(58) Field of Classification Search
CPC ........................................................ H01M 8/04
USPC ......... 429/443, 444, 415, 421, 428, 429, 513, 429/535
See application file for complete search history.

(56) References Cited

U.S. PATENT DOCUMENTS

| | | | |
|---|---|---|---|
| 5,682,845 A * | 11/1997 | Woody .................. | 123/73 A |
| 5,975,056 A * | 11/1999 | Augustin et al. ............. | 123/478 |
| 6,314,359 B1 * | 11/2001 | Janic et al. .................... | 701/110 |
| 8,071,249 B2 | 12/2011 | Hasuka et al. | |
| 2004/0131902 A1 * | 7/2004 | Frank et al. ...................... | 429/21 |
| 2007/0128488 A1 * | 6/2007 | Aoki et al. ....................... | 429/26 |
| 2009/0081492 A1 * | 3/2009 | Hasuka et al. ................... | 429/13 |

OTHER PUBLICATIONS

Synchr. definition Cambridge Dict.*
Definition of "synchronization", Cambridge Dictionary online cited from Cambridge Academic Content Dictionary, Nov. 2008.*

* cited by examiner

*Primary Examiner* — Patrick Ryan
*Assistant Examiner* — Alex Usyatinsky
(74) *Attorney, Agent, or Firm* — John A. Miller; Miller IP Group, PLC

(57) ABSTRACT

A system and method for regulating the pressure within a volume between a pressure regulator and an injector that injects hydrogen gas into the anode side of a fuel cell stack. The method includes delaying a copy of the a pulsed signal that controls the opening and closing of the injector a predetermined period of time and provides a bias signal from a look-up table that is determined by a desired average mass flow of the hydrogen gas flow to the fuel cell stack and the pressure at an upstream location of the hydrogen gas flow from the pressure regulator. The method selects the bias signal as a pressure regulator control signal that controls the pressure regulator when the delayed pulse injector signal is high and selects an arbitrary value at or near zero as the pressure regulator control signal when a delayed pulse injector is low.

20 Claims, 2 Drawing Sheets

ADVANCED CONTROLS ALGORITHM FOR AN ELECTRONIC PRESSURE REGULATOR SYSTEM WITH PULSED DISTURBANCES

BACKGROUND OF THE INVENTION

1. Field of the Invention

This invention relates generally to a system and method for regulating a gas flow from a high pressure gas tank system and, more particularly, to a system and method for regulating a gas flow from a high pressure gas tank system, where the method provides synchronous control between an electronic pressure regulator and an injector that injects the gas into an anode side of a fuel cell stack.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines. Fuel cell vehicles are expected to rapidly increase in popularity in the near future in the automotive marketplace.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack. In one known type of fuel cell system, the hydrogen gas fuel is injected into the anode side of the fuel cell stack by one or more injectors. The injector controls the amount of injected fuel for a particular stack current density based on pulse width modulation (PWM) control signal that controls the opening and closing of the injector.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Typically, hydrogen gas for the fuel cell system is stored at high pressure in a tank system including one or more interconnected pressure vessels on the vehicle to provide the hydrogen gas necessary for the fuel cell stack. The pressure within the vessels can be 700 bar or more. In one known design, the pressure vessels include an inner plastic liner that provides a gas tight seal for the hydrogen gas, and an outer carbon fiber composite layer that provides the structural integrity of the vessel.

A hydrogen storage system typically includes at least one pressure regulator as part of the various and numerous valves, gauges, and fittings necessary for operation of the hydrogen storage system that reduces the pressure of the hydrogen gas from the high pressure in the vessels to a constant pressure suitable for the fuel cell stack. Various pressure regulators are known in the art to provide this function, including mechanical pressure regulators and electronic pressure regulators.

Most fuel cell systems employ one or more injectors for injecting the reduced pressure hydrogen gas into the anode side of the fuel cell stack. The injectors are typically controlled by a pulse width modulation (PWM) signal having a certain duty cycle and frequency that provides the desired mass flow of the hydrogen gas for a command stack current density. However, the opening and closing of the injector in response to the PWM signal causes pressure oscillations or disturbances in the anode gas volume between the injector and the pressure regulator that reduces the performance of the pressure regulator.

SUMMARY OF THE INVENTION

In accordance with the teachings of the present invention, a system and method are disclosed for regulating the pressure within a volume between a pressure regulator and an injector that injects hydrogen gas into the anode side of a fuel cell stack. The method includes delaying a copy of the a pulsed signal that controls the opening and closing of the injector a predetermined period of time and provides a bias signal from a look-up table that is determined by a desired average mass flow of the hydrogen gas flow to the fuel cell stack and the pressure at an upstream location of the hydrogen gas flow from the pressure regulator. The method selects the bias signal as a pressure regulator control signal that controls the pressure regulator when the delayed pulse injector signal is high and selects an arbitrary value at or near zero as the pressure regulator control signal when a delayed pulse injector is low. The pressure regulator control signal can be rate limited to reduce peak oscillations. A proportional-integral controller generates a pressure error signal based on a difference between a desired pressure in the volume and the actual pressure within the volume, and adds the pressure error signal to the pressure regulator control signal to make a pressure correction.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling a pressure regulator that reduces the pressure of a hydrogen gas provided to an anode side of a fuel cell stack is merely exemplary in nature, and is in no way intended to limit the invention or its applications or uses. For example, as mentioned, the present invention has application for providing hydrogen gas to a fuel cell stack. However, as will be appreciated by those skilled in the art, the system and method of the invention may have application for controlling a pressure regulator in association with an injector that injects a gas for other applications.

Figure 1:
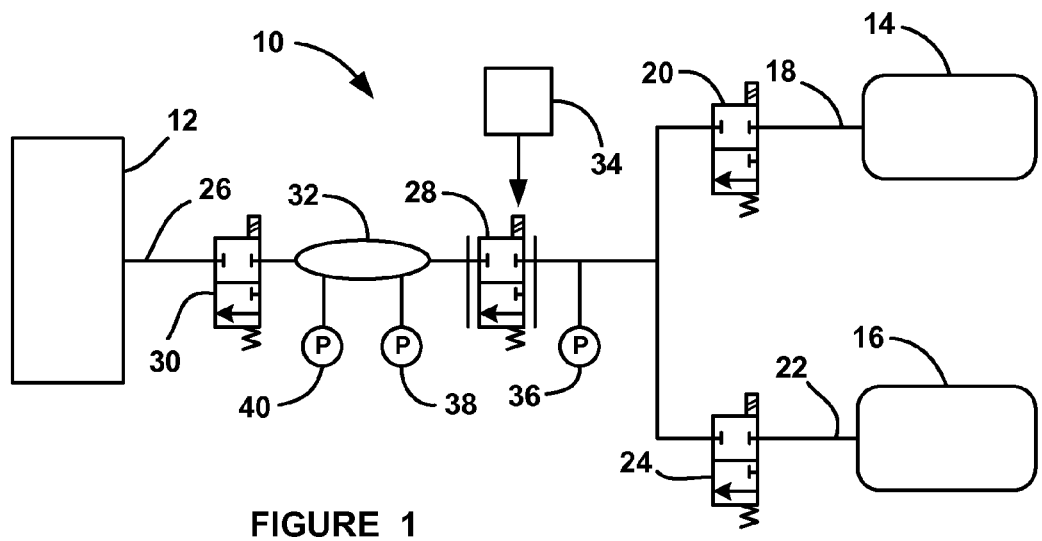
FIG. 1 is a schematic block diagram of a high pressure gas tank system for a fuel cell stack.

FIG. 1 is a simplified schematic block diagram of a high pressure gas tank system 10 for providing hydrogen gas to a fuel cell stack 12. The tank system 10 includes a first high pressure tank 14 and a second high pressure tank 16, where it will be understood that the tank system 10 could include any suitable number of high pressure tanks. The tanks 14 and 16 may contain the hydrogen gas at a pressure upwards of 700 bar, and can be any high pressure tank suitable for the purposes discussed herein, such as the high pressure vessel discussed above having an inner plastic liner and an outer structural composite layer. The high pressure tank 14 includes a tank shut-off valve 20 provided in an output line 18 from the tank 14 and the high pressure tank 16 includes a tank shut-off valve 24 provided in an output line 22 from the tank 16. The shut-off valves 20 and 24 generally provide a safety control for the high pressure in the tanks 14 and 16, respectively. The tank output lines 18 and 22 are coupled to an anode side input line 26 that provides the hydrogen gas stored in the tanks 14 and 16 to the fuel cell stack 12. A pressure sensor 36 is provided in the line 26 to provide a high pressure reading of the pressure within the tanks 14 and 16 when the valves 20 and 24 are open for system control purposes.

An electronic pressure regulator 28 is provided in the input line 26 downstream from the pressure sensor 36 that selectively reduces and provides a constant pressure of the gas from the high pressure of the tanks 14 and 16 to a pressure suitable for the fuel cell stack 12, in a manner that is well understood by those skilled in the art. In one embodiment, the pressure regulator 28 is a proportional valve having an adjustable orifice. As is well understood by those skilled in the art, the size of the orifice in the regulator 28 and the pressure upstream in the anode line 26 controls the flow rate and the amount of gas that is provided downstream of the pressure regulator 28.

The reduced pressure hydrogen gas in the input line 26 downstream of the pressure regulator 28 is injected into the anode side of the fuel cell stack 12 by an injector 30. The position of the orifice in the pressure regulator 28 is selectively controlled by a controller 34 to control the pressure of the gas in a volume 32. The volume 32 represents and defines the size of the various tubing and piping within the system 10 downstream of the regulator 28 or the anode gas volume between the pressure regulator 28 and the injector 30. The injector 30 is controlled by a PWM signal to provide the proper amount of hydrogen gas to the fuel cell stack 12 for a particular stack current density, where the PWM signal has a defined duty cycle and frequency based on the pressure within the volume 32. Although a single injector is shown in this non-limiting embodiment to inject the hydrogen gas into the stack 12, those skilled in the art will understand that a fuel cell system may include a bank of several injectors that inject the hydrogen gas into the stack 12. Two redundant pressure sensors 38 and 40 are provided in the line 26 downstream of the pressure regulator 28 that measure the pressure within the volume 32. The controller 34 receives the pressure measurements from the pressure sensors 36, 38 and 40 and the PWM signal that controls the opening and closing of the injector 30, and controls the position of the pressure regulator 28 so that the pressure in the volume 32 remains substantially constant during normal system operation.

At any point in time during operation of the system 10, a specific gas volume is confined within the volume 32 between the pressure regulator 28 and the injector 30. When the injector 30 is opened, the gas within the volume 32 flows into the fuel cell stack 12 and the pressure within the volume 32 decreases. This decrease in pressure is measured by the pressure sensors 38 and 40, which causes the controller 34 to open or increase the size of the orifice in the pressure regulator 28 to allow more gas to flow into the volume 32 to increase the pressure therein. Because the injector 30 is a discrete valve that is either open or closed depending on the pulses in the PWM signal and the injector 30 is opened and closed at a very high rate, the pressure in the volume 32 oscillates in response to the operation of the injector 30, which causes disturbances. This oscillation of the pressure within the volume 32 reduces the efficiency at which the pressure regulator 38 can regulate the pressure within the volume 32.

For those systems that employ only a single injector, the pressure oscillations in the volume 32 as a result of the opening and closing of the injector 30 is more significant than if the system 10 employed multiple injectors. Additionally, an increase in the size of the volume 32 so that there is more gas therein would reduce the oscillations and disturbances from the opening and closing of the injector 30. However, it is desirable for the volume 32 to be as small as practical for safety purposes because there is a limit to the amount of hydrogen gas that can be safely vented to the environment. Further, for cost reasons and the like, it is also desirable for the volume 32 to be as small as possible. It is also necessary for the piping and hoses that carry the hydrogen gas between the pressure regulator 28 and the injector 30 to have a diameter and/or area that causes the gas flow to be sub-sonic and not super-sonic. Thus, there are competing interests to optimize the size of the volume 32, where the ultimate size of the volume 32 is such that the oscillations and disturbances from the opening and closing of the injector 30 does adversely affect the ability to provide pressure regulation by the pressure regulator 28.

As will be discussed in detail below, the present invention proposes a control scheme for controlling the pressure regulator 28 to control the pressure in the volume 32 between the pressure regulator 28 and the injector 30 that reduces or eliminates the oscillations and disturbances of the pressure in the volume 32 as a result of opening and closing the injector 30. Particularly, if the controller 34 knows when the injector 30 is going to be opened, it can open the pressure regulator 28 at the same time to balance the gas flow out of the injector 30 and the gas flow out of the pressure regulator 28. In other words, when the injector 30 is commanded open, the controller 34 commands the pressure regulator 28 to be opened the proportional amount, subject to delays in the system 10, so that the flow of gas out of the volume 32 is nearly the same as the flow of gas into the volume 32 and so that the pressure in the volume 32 remains substantially constant and does not have pressure oscillations.

Figure 2:
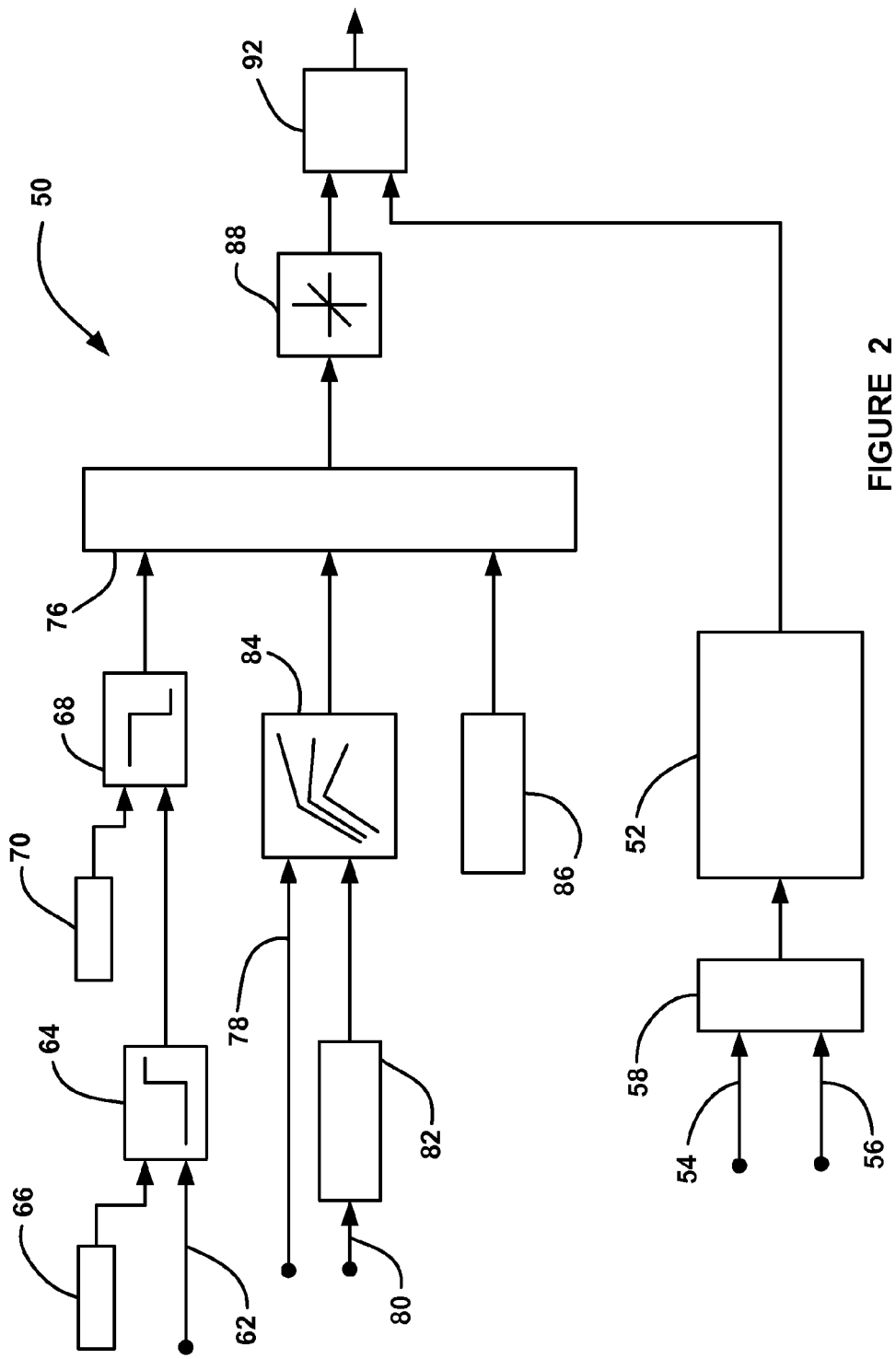
FIG. 2 is a block diagram showing the operation of an algorithm for controlling the hydrogen gas for the system shown in FIG. 1.

FIG. 2 is a schematic block diagram of a system 50 that shows the operation of an algorithm operating in the controller 34 for controlling the position of the pressure regulator 28 so that it is synchronous with the operation of the injector 30, as described above. The system 50 includes a proportional-integral (PI) controller 52 that provides a DC pressure error control signal that defines a difference between a desired pressure within the volume 32 and the actual pressure within the volume 32, as measured by one or both of the pressure sensors 38 and 40. Particularly, a pressure request signal is provided on line 54 and an actual pressure measurement signal is provided on line 56 from the pressure sensor 38 or 40 that are sent to a subtractor 58 that generates a pressure error signal between the two signals, where the error signal is provided to the PI controller 52. The pressure request signal is the calibrated pressure for the volume 32 that will provide the desired amount of hydrogen gas through the control of the injector 30. The controller 52 operates as a standard PI controller that attempts to reduce the error signal by controlling the deviation between the pressure set-point and the actual pressure in the volume 32.

As mentioned above, the control of the pressure regulator 28 is synchronized to the opening and closing of the injector 30. The PWM signal that controls the injector 30 is used to provide this synchronization in the system 50. Because there are electrical and mechanical delays between the PWM signal provided to the injector 30 and the actual operation of the injector 30, the PWM signal used to provide the synchronization needs to be delayed for the proper control of the pressure regulator 28. To do this, the PWM signal that controls the injector 30 is provided on line 62 to a delay block 64, where the rising edge of a particular pulse in the PWM signal is delayed a certain time by the delay block 64 as defined by a predetermined delay at box 66. The delayed rise of the particular pulse in the PWM signal is provided to a delay block 68 that delays the falling edge of the pulse by a predetermined delay as provided by box 70. The delay provided by the delay boxes 66 and 70 would be the same, would be determined by calibration and testing techniques for the particular system, and may be different for different systems.

Figure 3:
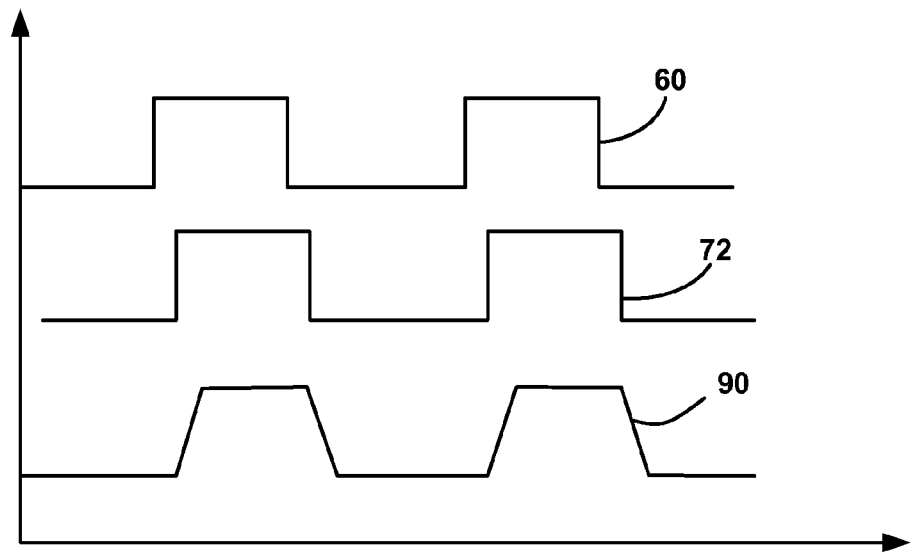
FIG. 3 is a graph with time on the horizontal axis and magnitude on the vertical axis showing a timing relationship between a PWM signal for controlling an anode injector, a delayed PWM signal and a rate limited bias signal for controlling a pressure regulator.

FIG. 3 is a graph with time on the horizontal axis and magnitude on the vertical axis. The PWM signal on the line 62 is shown by graph line 60 and the delayed PWM signal from the delay box 68 is shown by graph line 72.

The system 50 provides a feed-forward bias signal that determines when the pressure regulator 28 is opened, where the bias signal is determined by the requested mass flow of hydrogen gas to the fuel cell stack 12 and the pressure at the upstream location of the pressure regulator 28. Particularly, an average hydrogen gas mass flow request signal, such as determined by the position of the throttle in the vehicle, is provided on line 78 and the measured high pressure in the tanks 14 and 16, as provided by the sensor 36, is provided on line 80, where the pressure measurement signal is filtered by a filter 82. The mass flow signal and the pressure signal are set to a two-dimensional look-up table 84 that selects the proper bias signal for opening the pressure regulator 28 the proper amount for the desired hydrogen gas flow to the injector 30. The pressure measurement signal needs to be filtered because disturbances caused by the opening and closing of the pressure regulator 28 could influence the bias signal provided by the look-up table 84. The bias signal from the look-up table 84 is a DC signal whose magnitude changes in step increments if the average hydrogen gas mass flow request and/or the high pressure measurement change enough to select a different value in the look-up table 84.

The delayed PWM signal from the delay block 68, the bias signal from the look-up table 84 and a predetermined value provided by box 86 are sent to a logic block 76. If the delayed PWM signal from the block 68 is high, meaning that the injector 30 has been commanded open, subject to the delay, then the logic block 76 selects the bias signal from the look-up table 84 as a regulator control signal that is output from the logic block 76. If the output of the block 68 is low, meaning that the injector 30 has been commanded closed, subject to the delay, then the logic block 76 selects the value from the box 86 as the regulator control signal that is output from the logic block 76. Typically, the value from the block 86 will be zero or nearly zero. Therefore, the control signal from the logic block 76 is a duty cycle signal having pulses that have a pulse width that match the delayed pulses in PWM signal for the injector 30, but where the magnitude of the pulses in the control signal are set by the bias signal from the look-up table 84.

The control signal from the logic block 76 is provided to a rate limiter block 88 that limits how fast the pulses in the control signal will rise from zero to high and fall from high to zero so as to further avoid pressure peaks. The rate limited control signal is represented by graph line 90 in FIG. 3. The rate limited control signal and the pressure error control signal from the PI controller 52 are added by an adder 92 to provide the actual control signal that determines the position of the orifice of the pressure regulator 28 that is synchronized to the opening and closing of the injector 30. Therefore, the feed-forward control provided by the bias signal provides most of the control for the position of the pressure regulator 28 and the error control signal from the PI controller 52 slightly modifies that bias signal in the adder 92 to correct the deviation between the desired pressure and the actual pressure in the volume 32. Because the PI controller 52 only needs to correct the deviation between the pressures, it needs to perform less control work than normal, which provides a more stable control.

As will be well understood by those skilled in the art, the several and various steps and processes discussed herein to describe the invention may be referring to operations performed by a computer, a processor, or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling a pressure regulator that regulates a gas flow, said method comprising:
   providing a source of the gas;
   injecting a flow of the gas from the source into a device using at least one injector; and controlling the pressure of the gas within a volume between the pressure regulator and the injector using the pressure regulator by synchronizing an opening and closing of the pressure regulator with an opening and closing of the injector such that the pressure regulator and the injector are opened and closed at about the same time.

2. The method according to claim 1 wherein controlling the pressure within the volume includes providing a bias signal based on a desired average mass flow of the gas and a pressure at an upstream location of the hydrogen gas flow from the pressure regulator.

3. The method according to claim 2 wherein providing the bias signal includes selecting the bias signal from a two-dimensional look-up table.

4. The method according to claim 2 wherein controlling the pressure within the volume includes delaying a pulsed injector signal that controls the opening and closing of the injector a predetermined period of time and selecting the bias signal as a regulator control signal that controls the pressure regulator when the delayed pulsed injector signal is above a predetermined threshold.

5. The method according to claim 4 further comprising selecting an arbitrary value that is zero or approximately zero as the regulator control signal when the delayed pulse injector signal is below a predetermined threshold.

6. The method according to claim 4 further comprising rate limiting the control signal when the bias signal is selected to reduce a rise and fall time of the bias signal.

7. The method according to claim 4 further comprising adding a pressure error signal to the selected bias signal that defines an error between a desired pressure within the volume and an actual pressure within the volume.

8. The method according to claim 7 wherein the error control signal is provided by a proportional-integral controller.

9. The method according to claim 1 wherein the device is a fuel cell stack and the gas is a hydrogen gas and wherein the at least one injector injects the hydrogen gas into an anode side of the fuel cell stack.

10. The method according to claim 1 wherein providing a source of the gas includes the source of gas being a high pressure source.

11. The method according to claim 1 wherein using at least one injector includes that the at least one injector is only one injector.

12. The method according to claim 1 wherein controlling a pressure regulator includes that the pressure regulator is a proportional electronic pressure regulator.

13. A method for controlling a proportional electronic pressure regulator that regulates a hydrogen gas flow to an anode side of a fuel cell stack where the hydrogen gas is injected into the fuel cell stack by an injector, said method comprising:
    delaying a pulsed injector signal that controls the opening and closing of the injector a predetermined period of time;
    providing a bias signal based on a desired average mass flow of the hydrogen gas and a pressure at an upstream location of the hydrogen gas flow from the pressure regulator;
    selecting the bias signal as a pressure regulator control signal that controls the pressure regulator when the delayed pulsed injector signal is above a predetermined threshold;
    selecting an arbitrary value that is zero or approximately zero as the pressure regulator control signal when the delayed pulsed injector signal is below a predetermined threshold; and
    adding a pressure error signal to the control signal where the pressure error signal is an error between a desired pressure within the volume and the actual pressure within the volume.

14. The method according to claim 13 further comprising rate limiting the control signal when the bias signal is selected to reduce a rise and fall time of the bias signal.

15. The method according to claim 13 wherein providing the bias signal includes selecting the bias signal from a two-dimensional look-up table.

16. The method according to claim 13 wherein adding the error signal includes adding the error signal provided by a proportional-integral controller.

17. A system for controlling a proportional electronic pressure regulator that regulates a hydrogen gas flow to an anode side of a fuel cell stack where the hydrogen gas is injected into the fuel cell stack by an injector, said system comprising:
    a controller programmed to provide:
    means for delaying a pulsed injector signal that controls the opening and closing of the injector a predetermined period of time;
    means for providing a bias signal based on a desired average mass flow of the hydrogen gas and a pressure and an upstream location of the hydrogen gas flow from the pressure regulator;
    means for selecting the bias signal as a pressure regulator control signal that controls the pressure regulator when the delayed pulsed injector signal is above a predetermined threshold;
    means for selecting an arbitrary value that is zero or approximately zero as the pressure regulator control signal when the delayed pulsed injector signal is below a predetermined threshold; and
    means for adding a pressure error signal to the control signal where the pressure error signal is an error between a desired pressure within the volume and the actual pressure within the volume.

18. The system according to claim 17 further comprising means for rate limiting the control signal when the bias signal is selected to reduce a rise and fall time of the bias signal.

19. The system according to claim 17 wherein the means for providing the bias signal selects the bias signal from a two-dimensional look-up table.

20. The system according to claim 17 wherein the means for adding the error signal adds the error signal provided by a proportional-integral controller.

* * * * *